(No Model.) 5 Sheets—Sheet 2.
S. B. ALLISON.
MOSS AND FIBER BRAKE, HACKLING, AND WASHING MACHINE.
No. 468,632. Patented Feb. 9, 1892.
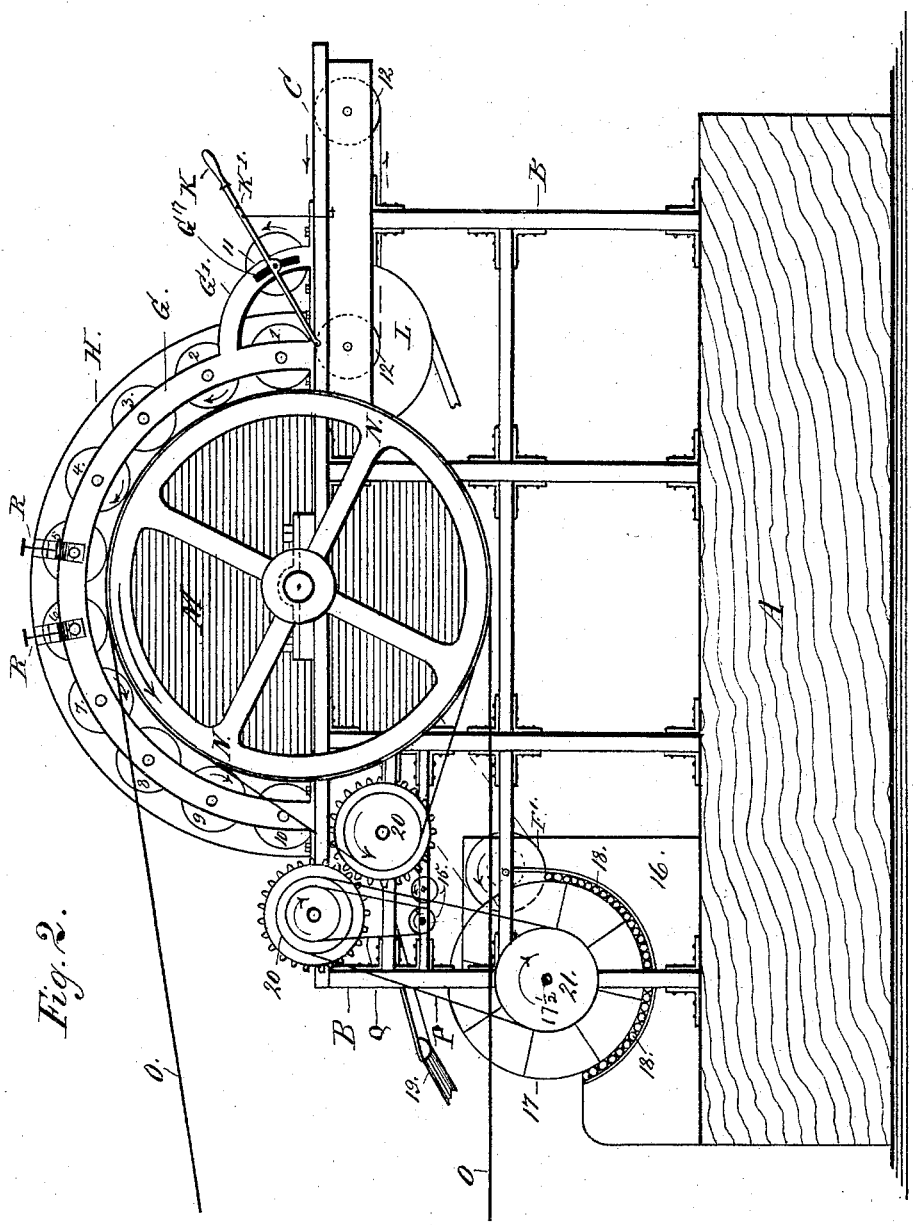
WITNESSES
Helmuth Holtz.
Percy D. Parsle.
INVENTOR
Samuel B. Allison.
by W. R. Stringfellow
Attorney (No Model.) 5 Sheets—Sheet 3.

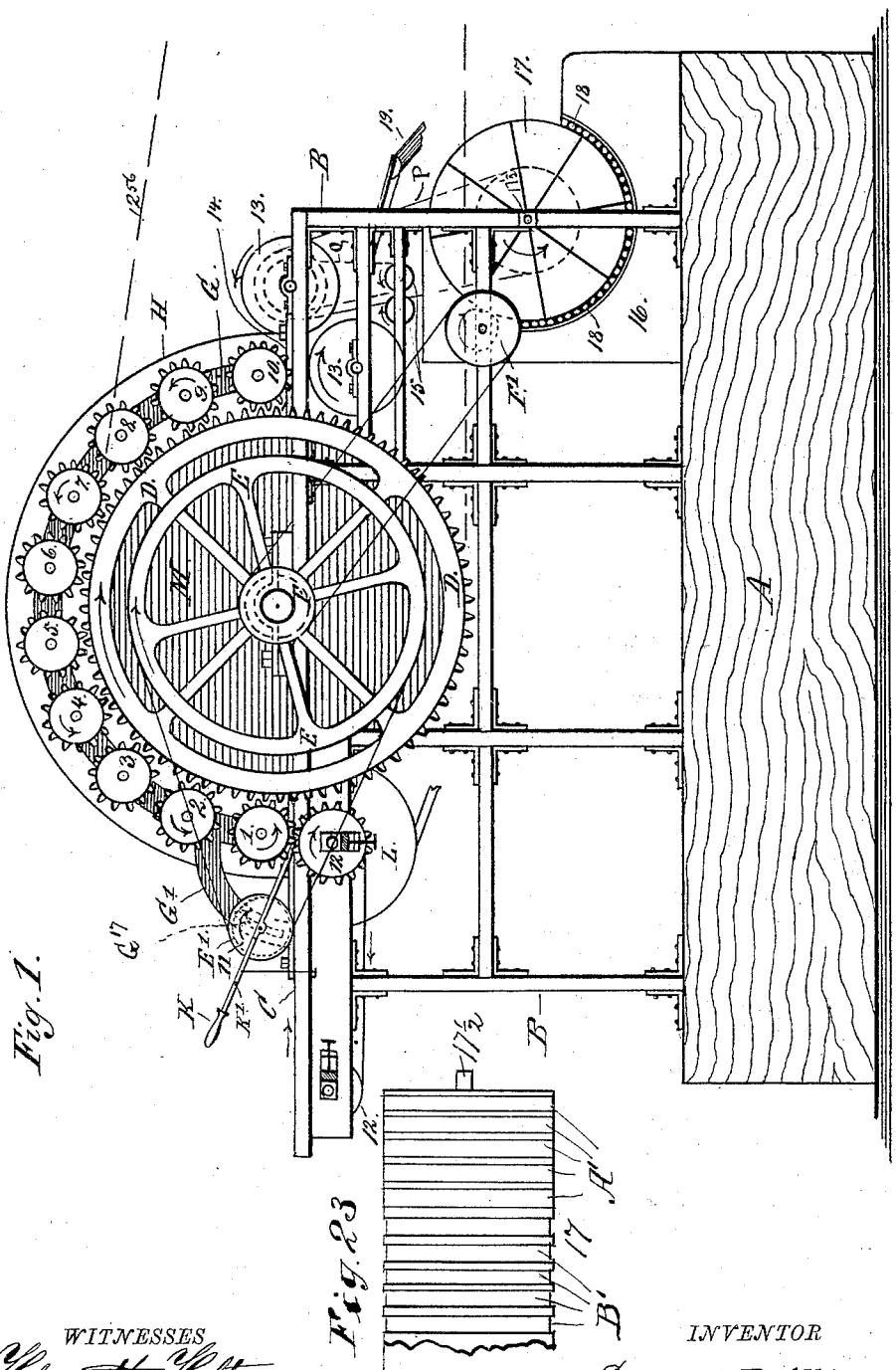

S. B. ALLISON.
MOSS AND FIBER BRAKE, HACKLING, AND WASHING MACHINE.

No. 468,632. Patented Feb. 9, 1892.

WITNESSES
Helmuth Holtz
Percy D. Paris

INVENTOR
Samuel B. Allison
by W. R. Stringfellow
Attorney (No Model.) 5 Sheets—Sheet 4.

S. B. ALLISON.
MOSS AND FIBER BRAKE, HACKLING, AND WASHING MACHINE.

No. 468,632. Patented Feb. 9, 1892.

WITNESSES
Helmuth Holtz
Percy D. Parsls

INVENTOR
Samuel B. Allison.
by W. R. Stringfellow
Attorney (No Model.) 5 Sheets—Sheet 5.

S. B. ALLISON.
MOSS AND FIBER BRAKE, HACKLING, AND WASHING MACHINE.

No. 468,632. Patented Feb. 9, 1892.

WITNESSES
Helmuth Holtz.
Percy D. Parks.

INVENTOR
Samuel B. Allison.
by W. R. Stringfellow
Attorney

UNITED STATES PATENT OFFICE.

SAMUEL B. ALLISON, OF NEW ORLEANS, LOUISIANA.

MOSS AND FIBER BRAKE, HACKLING, AND WASHING MACHINE.

SPECIFICATION forming part of Letters Patent No. 468,632, dated February 9, 1892.

Application filed May 12, 1891. Serial No. 392,476. (No model.)

*To all whom it may concern:*

Be it known that I, SAMUEL BENJAMIN ALLISON, a citizen of the United States, residing at New Orleans, in the parish of Orleans and State of Louisiana, have invented certain new and useful Improvements in Moss and Fiber Brakes, Hackles, and Washing-Machines; and I do declare the following to be a full, clear, and exact description of the invention, such as will enable others skilled in the art to which it appertains to make and use the same.

My invention relates to an improvement in machines for breaking, hackling, and washing moss and fibrous plants, and its novelty will be fully understood from the following description and claims, when taken in connection with the annexed drawings; and the objects of my invention are to provide a machine for treating wood fibers or leaves—such as pine-apple, bear-grass, banana plants, or other plants. I attain these objects from the mechanism illustrated in the accompanying drawings, in which—

Figure 5:
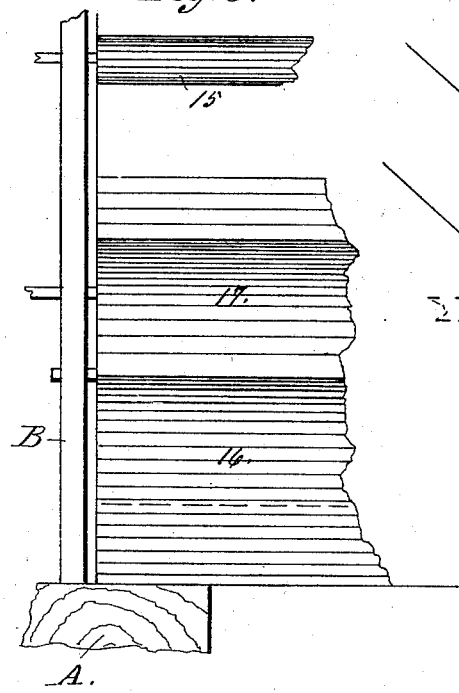
Figure 6:
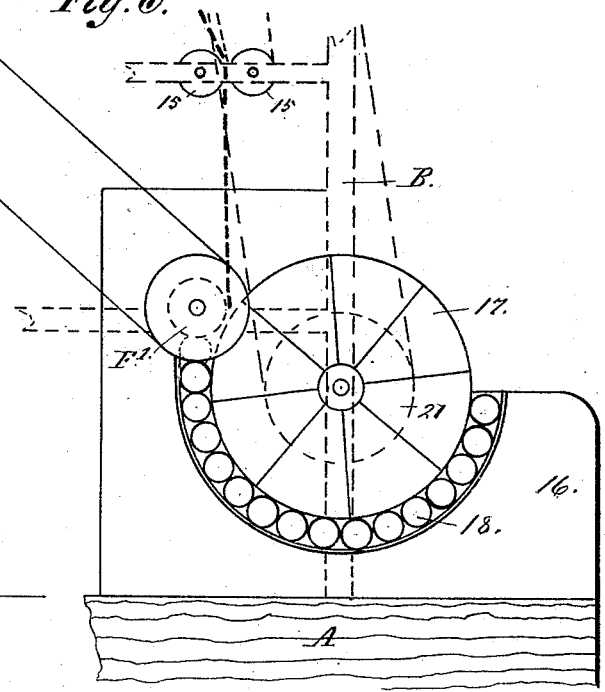
Figure 7:
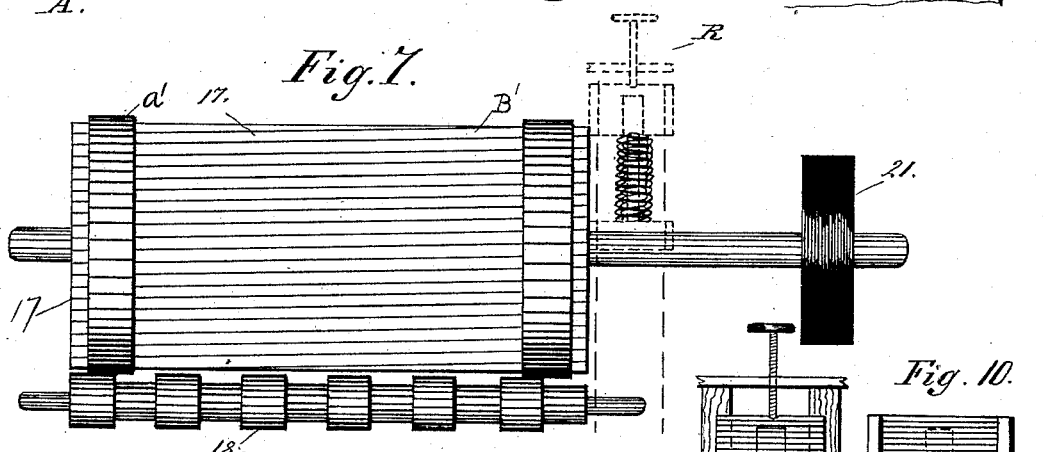
Figure 8:
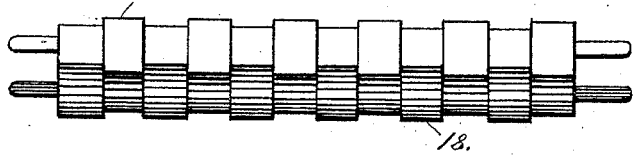
Figures 9, 10, 11, 12:
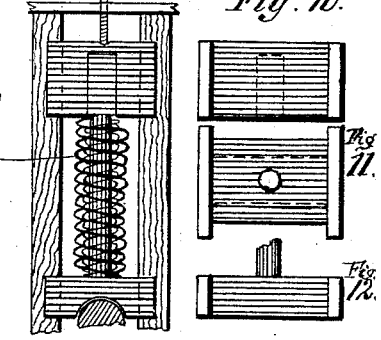
Figure 13:
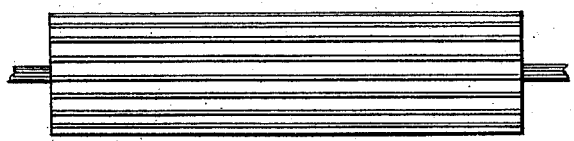
Figure 14:
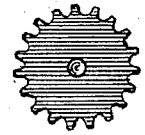
Figure 15:
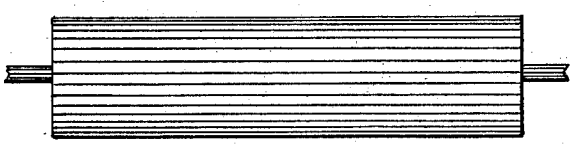
Figure 16:
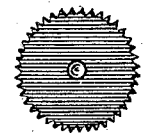
Figure 17:
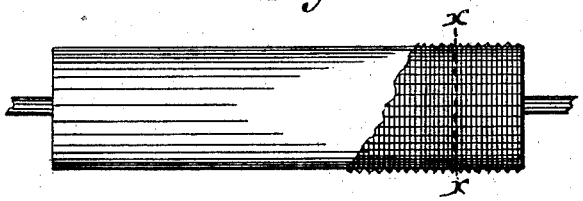
Figure 18:
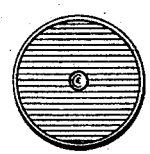
Figure 19:
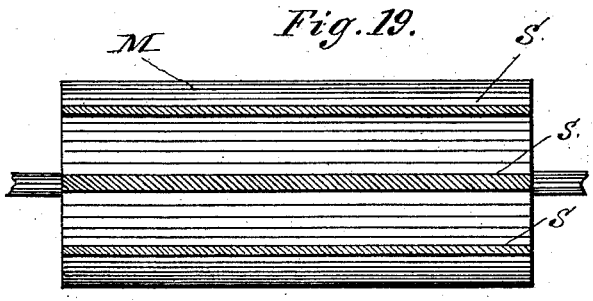
Figure 20:
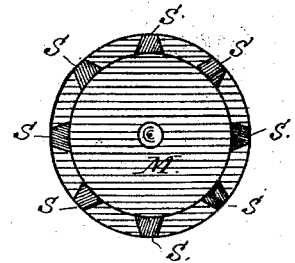
Figure 21:
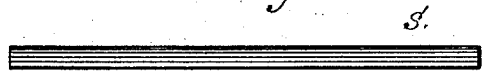
Figure 22:

Figure 1 is a right-handed side view looking from the front of the machine. Fig. 2 is a left-handed side view thereof. Fig. 3 is a front view thereof. Fig. 4 is a side view of the lifting-pulley, showing part of the drum and three of the ten rollers. Fig. 5 is a rear view of the washing-machine. Fig. 6 is a side view of the washing-machine. Fig. 7 is a side view of the main roller, corrugated roller, and set-screw. Fig. 8 is a top view of the corrugated rollers. Fig. 9 is a front view of the set-screw, showing the springs. Fig. 10 is a side view of the set-screw, showing the top piece. Fig. 11 is a top view of the bottom piece thereof. Fig. 12 is a sectional side view of the bottom piece thereof. Fig. 13 is a side view of a longitudinal corrugated roller. Fig. 14 is an end view thereof. Fig. 15 is a side view of a small longitudinal corrugated roller. Fig. 16 is an end view thereof. Fig. 17 is a side view of a diametrical corrugated roller, partially covered by rubber bands. Fig. 18 is a sectional view thereof, taken on the line $x\ x$, Fig. 17. Fig. 19 is a side view of a slotted roller. Fig. 20 is an end view thereof. Fig. 21 is a smooth tongue for inserting in slots of roller 19. Fig. 22 is an end view thereof. Fig. 23 is a detached side elevation of part of the washing-drum.

Similar letters and numerals refer to similar parts throughout the several figures.

In the drawings, A represents a base; B, a frame; C, the feed-table; D, a geared wheel, which drives the rollers 1 2 3 4 5 6 7 8 9 10; E, a smoothed-face wheel for driving the adjustable roller 11; E', a pulley; F and F', small pulleys for driving the washing-machine; G, a metal frame for rollers; G', frame-pieces with slots $G^{17}$ therein, in which the spindle of the roller 11 is adjusted. Encircling pressure-rollers 1 2 3 4 5 6 7 8 9 10 is a frame H, which is provided with openings for inserting set-screws R, by which the pressure of the rollers 1 to 10 may be regulated. K are levers, which are connected to a rod K', and by means of rod K' and levers K roller 11 can be raised or lowered, so as to increase or diminish the space between the said roller 11 and the table C, as shown in Fig. 4. L is a receiving-kettle for the liquids that may be pressed from the material, passed between the roller 11 and table C. M is a drum having a series of dovetail grooves into which are fitted smooth lags or tongues S, that can be removed and replaced by lags which have scrapers, knives, brushes, or rubbers thereon, thus permitting the change of working parts between the pressure-rollers 1 to 10 and the main drum M. 13, as shown in Fig. 1, are conveying-rollers, which assist the material in passing from the scraping-plates 14 down upon the rubber-holding rollers 15, and thence into washing-box 16, where it falls upon washing-drum 17 and is passed between the drum 17 and corrugated rollers 18. At a point shown by 19 is a discharge-chute for residue. This scraping-plate is constructed of plate metal, secured to the table C, so that its lower or scraping edge rests upon the rollers 13 and is free from any material that would otherwise adhere thereto. Dotted lines 256 in Fig. 1 show the main driving-belt.

P is a belt, by means of which motion is imparted from the pulley 20 to the pulley 21 upon shaft $17\frac{1}{2}$ of the washing-drum 17.

Q is a short belt transmitting power from the pulley 20 to the rubber-holding rollers 15.

The drum 17 is secured across the rear of the machine upon the shaft 17½, so that the material dropping upon the surface thereof is carried down into the box 16, where it is acted upon by the rollers 18.

In practice the material to be treated is placed upon the feed-table C and is carried forward between the drum M and the pressure-rollers 1 to 10 by the rotation of the said drum M, the treatment of material depending upon its quality, my machine being so constructed as to change its working parts. Thus, for instance, in the treatment of ramie scutchers, knives, plates, with hackle-teeth, brushes, or smooth plates placed upon lags or tongues may be inserted in slots of drum M, and where moss, oakum, and other species of wood fibers are treated corrugated rollers can be used. In treating pulpy fibers or leaves—such as pine-apple, bear-grass, &c.—I use circular grooved and rubber rollers. The fluted rollers in the washing-machine prevent wrapping of fiber, while action of the washing-drum 17 imparts motion to rollers 18, carrying the fibrous mass continuously forward while being acted upon and discharging material over box 16. The peculiar construction of rollers 18 prevent wrapping of fiber, while the drum 17, having grooves or corrugations B' and provided with rubber friction-bands a', dispenses with cog wearing, also with use of stuffing-boxes, and prevents leaking of washing-tank by working on inside of same. The tank is always partly filled with water when working green fiber, and when dry fiber is being treated the water is all drained off from the tank, leaving it clean and dry. All working rollers are provided with set-screws, in order to regulate their pressure. Roller 11 can be used as a splitting or scraping device when working leaf plants. 13 acts as a cleaner for the drum M and receives the fiber from the scraping-plate 14, freeing the drum M from any fiber that may have escaped from the scraping-plates 14, thereby preventing wrapping, and carries material downward through rollers 13, beating and combing fiber and delivering the waste or residue to chute 19, while the fiber passes downward through rubber-holders 15 into box 16 and is discharged out of box by means of drum 17 upon an endless carrier. (Not shown.)

Having thus described my invention, what I claim as new is—

1. In a moss and fiber brake, hackle, and washing-machine, the drum M, a series of pressure-rollers partially surrounding the drum, the feed-carrier, and the feed-regulating roller, in combination with the conveying-rollers 13 and the rubber-holder rollers 15, substantially as and for the purpose set forth.

2. In a moss and fiber brake, hackle, and washing-machine, the grooved drum M, the lags S, adapted to be secured in the grooves of the drum, the feed-carrier, the regulating feed-roller 11, and a series of pressure-rollers partially surrounding the said drum, in combination with the washing-box and the drum 17, provided with rubber bands, and means for conveying the fiber from the breaking mechanism to the said washing-box, substantially as and for the purpose set forth.

In testimony whereof I affix my signature in presence of two witnesses.

SAMUEL B. ALLISON.

Witnesses:
 HELMUTH HOLTZ,
 PERCY D. PARKS.